United States Patent
Hoelzl et al.

(10) Patent No.: US 9,475,010 B2
(45) Date of Patent: Oct. 25, 2016

(54) POROUS MEMBRANES MADE UP OF ORGANOPOLYSILOXANE COPOLYMERS

(75) Inventors: Manfred Hoelzl, Burghausen (DE); Frauke Kirschbaum, Munich (DE)

(73) Assignee: Wacker Chemie AG, Munich (DE)

( * ) Notice: Subject to any disclaimer, the term of this patent is extended or adjusted under 35 U.S.C. 154(b) by 543 days.

(21) Appl. No.: 13/057,216

(22) PCT Filed: Aug. 13, 2009

(86) PCT No.: PCT/EP2009/060511
§ 371 (c)(1),
(2), (4) Date: Feb. 2, 2011

(87) PCT Pub. No.: WO2010/020584
PCT Pub. Date: Feb. 25, 2010

(65) Prior Publication Data
US 2011/0127219 A1    Jun. 2, 2011

(30) Foreign Application Priority Data
Aug. 22, 2008  (DE) ........................ 10 2008 041 477

(51) Int. Cl.
*B01D 71/06* (2006.01)
*B01D 71/70* (2006.01)
*B01D 69/02* (2006.01)
*B01D 69/12* (2006.01)
*B01D 71/76* (2006.01)
*B01D 71/54* (2006.01)
*B01D 71/56* (2006.01)

(52) U.S. Cl.
CPC .............. *B01D 71/06* (2013.01); *B01D 69/02* (2013.01); *B01D 69/12* (2013.01); *B01D 71/76* (2013.01); *B01D 71/54* (2013.01); *B01D 71/56* (2013.01); *B01D 71/70* (2013.01)

(58) Field of Classification Search
CPC .. C08G 18/61; C08G 77/458; C08G 18/289; C08G 18/10; C08G 18/3893; C08G 77/455; C08G 2340/00; C08G 77/38; C08L 75/04; C08L 83/10; C08L 83/04; B01D 71/70; B01D 71/54; B01D 69/12; B01D 69/02
USPC .................. 210/650, 500.1, 500.21, 500.37, 210/500.38, 506, 507
See application file for complete search history.

(56) References Cited

U.S. PATENT DOCUMENTS

| 3,133,132 | A | 5/1964 | Loeb et al. |
| 3,133,137 | A | 5/1964 | Loeb et al. |
| 3,615,024 | A | 10/1971 | Michaels |
| 3,925,211 | A | 12/1975 | Schumann et al. |
| 4,484,935 | A | 11/1984 | Zampini |
| 4,744,807 | A | 5/1988 | Minhas et al. |
| 4,880,441 | A * | 11/1989 | Kesting et al. ................. 95/47 |
| 5,082,565 | A | 1/1992 | Haubs et al. |
| 5,290,448 | A | 3/1994 | Sluma et al. |
| 5,733,663 | A | 3/1998 | Scheunemann et al. |
| 6,815,069 | B2 * | 11/2004 | Hohberg et al. ........... 428/423.1 |
| 2003/0176613 | A1 * | 9/2003 | Hohberg et al. ................. 528/28 |
| 2004/0254325 | A1 | 12/2004 | Kuepfer et al. |
| 2006/0167207 | A1 | 7/2006 | Thiele et al. |

FOREIGN PATENT DOCUMENTS

| DE | 2 318 346 | 10/1974 |
| DE | 39 36 997 | 5/1991 |
| DE | 103 26 575 | 1/2005 |
| GB | 1 536 432 | 12/1978 |
| JP | 57156005 A | 9/1982 |
| JP | 59049804 A | 3/1984 |
| JP | 59-225703 | 12/1984 |
| JP | 60012105 A | 1/1985 |
| JP | 62250904 A | 10/1985 |
| JP | 6-277438 | 10/1994 |
| JP | 2007-268321 | * 10/2007 |
| JP | 2007268321 A | 10/2007 |
| JP | 2008-86903 | 4/2008 |

OTHER PUBLICATIONS

English language machine translation of JP 2007-268321, pp. 1-16, No Date.*
PatBase abstract for JP 6-277438.
English translation for JP 59-225703.
PatBase abstract for JP 2008-86903.
McGrath et al. in Advances in Polymer Science, 1988, vol. 86, S. 1-70.
Sava at al. in Revue Roumaine de Chimie, 2007, vol. 52, S. 127-133.

(Continued)

*Primary Examiner* — David C Mellon
*Assistant Examiner* — Pranav Patel
(74) *Attorney, Agent, or Firm* — Caesar Rivise, PC

(57) ABSTRACT

The object of the invention is porous membranes (M) comprising organopolysiloxane/polyurea/polyurethane/polyamide/polyoxalyl diamine copolymers of the general formula (1), where R, X, Y, D, E, F, B, B', m, n, a, b, c and d have the meanings indicated in claim 1, with the proviso that at least 10% of the $R^H$ groups present in structural elements E, F and bound to nitrogen indicate hydrogen, and a method for the production of the membranes (M) and use thereof for separating material mixtures.

(1)

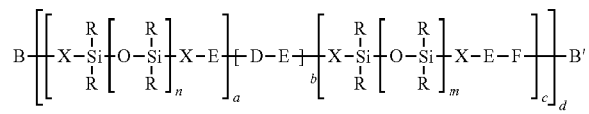

9 Claims, No Drawings

(56) References Cited

OTHER PUBLICATIONS

Atlas of Zeolite Framework Types, 5th edition, Ch. Baerlocher, W.M. Meier D.H. Olson, Amsterdam: Elsevier 2001).
Ullmann's Enzyklopadie der Technischen Chemie 4. Auflage, Band 21, Seite 464.
F. Saint-Michel, F. Pignon, A. Magnin, J. Colloid Interface Sci. 2003, 267, 314.
G.W. Sears, Anal. Chem. 28 (1956) 1981.
Membrane Technologie and Applications, second Edition, R. W. Baker, New York, Wiley, 2004.
International Search Report for PCT/EP2009/060511, mailed Nov. 2, 2009.
PatBase Abstract for JP 57-156005.
PatBase Abstract for JP 59-49804.
PatBase Abstract for JP 60-12105.
PatBase Abstract for JP 62-250904.
PatBase Abstract for JP 2007-268321.
Allport et al. "Health" in "MDI and TDI: Safety, Health and the Environment: A Source Book and Practical Guide", ISBN: 978-0-471-95812-3, pp. 31-32 (2003).
Primeaux. "Polyurea vs Polyurethane & Polyurethane/Polyurea: What's the Difference?" Polyurea Coatings: That Was Then, This is Now 2004 PDA Annual Conference, Mar. 2-4, 2004, Tampa, Florida.
Riedlich. "Risk of isocyanate exposure in the construction industry". CPWR—The Center for Construction Research and Training: 1-8 (2010).
Stone et al. "Getting rid of isocyanates". European Coatings Journal, Issue: Jul. 8, 2004, p. 38 (2004).
Wikipedia. "Isocyanate". Retrieved from https://de.wikipedia.org/wiki/Isocyanate (2016).
Wikipedia. "Isocyanate". Retrieved from https://en.wikipedia.org/wiki/Isocyanate (2016).
Wikipedia. "Isocynate". Retrieved from https://de.wikipedia.org/wiki/Isocyanate (2016), Machine translation.

* cited by examiner

POROUS MEMBRANES MADE UP OF ORGANOPOLYSILOXANE COPOLYMERS

BACKGROUND OF THE INVENTION

The invention relates to porous membranes comprising organopolysiloxane copolymers and their preparation, and also to their use for separating mixtures.

Separating mixtures using membranes is a long-established process. The separation of mixtures with membranes is usually accomplished with greater energy efficiency than by conventional separating methods, such as fractional distillation or chemical adsorption, for example. The search for new membranes with a longer lifetime, improved selectivities, better mechanical properties, a higher flow rate, and low costs, are aspects which are paid much attention in this search, in current membrane research.

Porous membranes of asymmetrical construction for separating any of a very wide variety of mixtures are known in the literature. Thus U.S. Pat. No. 3,133,137, U.S. Pat. No. 3,133,132, and U.S. Pat. No. 4,744,807 describe the preparation and use of asymmetrically constructed cellulose acetate membranes which are prepared by the phase inversion process. The process is likewise termed the Loeb-Sourirajan process. Membranes fabricated in this way have a porous under-structure and a selective layer. The thin outer layer is responsible for the separation performance, while the porous understructure leads to mechanical stability of the membranes. This kind of membranes is used in reverse osmosis plants for obtaining drinking water or ultrapure water from seawater or brackish water. Other membranes with this porous asymmetric construction are likewise known. Thus specifications U.S. Pat. No. 3,615,024, DE3936997, U.S. Pat. No. 5,290,448, and DE2318346 describe membranes comprising polysulfone, polyetherketones, polyacrylonitrile, and polyimide. Depending on the mode of preparation, very porous or more compact membranes are obtained. Typical applications of the membranes in these cases are reverse osmosis, ultrafiltration, nanofiltration, microfiltration, pervaporation, and the separation of gases. Through the polymers used, the polymers are partly hydrophilic. A consequence of this is that organic solutions are virtually impossible to separate, owing to the poor wetting.

The use of silicones as membrane material is likewise prior art. Silicones are rubberlike polymers having a low glass transition point (Tg<−50° C.) and a high fraction of free volume in the polymer structure. GB1536432 and U.S. Pat. No. 5,733,663 describe the preparation of membranes on the basis of silicones. Applications described include not only pervaporation but also the separation of gases.

Very thin silicone membranes, which would actually be necessary for optimum membrane performance, are impossible to handle, owing to the inadequate mechanical properties. In order to obtain the necessary mechanical stability of the silicones, the membranes described are always composite systems with a multilayer construction which is in some cases very complex and involved. The separation-selective silicone layer is always applied to a porous support substrate by methods such as, for example, spraying or solution application. Crosslinking takes place usually through a further step—for example, by aftercrosslinking with electromagnetic radiation or by the addition of catalysts.

A further application of silicones lies in the closing of defects in membranes that are used for separating gases. The polysulfone-based membranes described in U.S. Pat. No. 4,484,935 are sealed by an additional layer of silicone, in order to close small defects. The dense and compact silicone layer described therein is crosslinked by thermal treatment.

The use of organopolysiloxane copolymers as membranes is also prior art. US2004/254325 and DE10326575, for example, claim the preparation and use of thermoplastically processable organopolysiloxane/polyurea copolymers. The membrane applications for which the claimed silicones can be used are not described therein. Nor is the preparation of porous membranes described. Moreover, the use as membrane for separating gas/liquid, gas/solid, liquid/liquid, solid/liquid or solid/solid mixtures is not referred to in the patent specification. In addition, JP6277438 claims silicone-polyimide copolymer too as a material for preparing compact membranes. The applications recited therein are aimed at the separation of gases.

Likewise known in the literature are porous membranes comprising silicone-carbonate copolymers (JP55225703) and comprising silicone-polyimide copolymers (JP2008/86903). With both copolymers, however, the mechanical strength and the selectivity are not sufficient for technical deployment. With both copolymers, furthermore, there are virtually no physical interactions present, and this greatly lessens the thermal stability of the porous membrane structure. The silicone copolymers described, moreover, are very brittle, and this significantly hinders the preparation of typical wound membrane modules.

It is known, furthermore, that with silicone-carbonate copolymers the carbonate fraction in the copolymer must be high in order to obtain useful film-forming properties. Consequently, the favorable permeabilities of silicone are greatly impaired by the significantly less permeable polycarbonate.

A feature of the synthesis of silicone-imide copolymers is that the imidizing step must be carried out at temperatures of well above 250° C., and this is technically involved and makes the copolymers prepared expensive. Polyimides, moreover, have significantly poorer solubility, and this is unfavorable for the preparation of porous membranes.

This greatly restricts the use of both systems. Furthermore, for both copolymers, preparation is a very involved process, and this is unfavorable for industrial implementation.

In principle, the only polymers suitable for preparing porous membranes are those which possess sufficient mechanical strength and adequate flexibility. Furthermore, if preparation is carried out by means of the phase inversion process, the polymers must be soluble in an appropriate solvent which is miscible with the medium of the inversion bath. Typical polymers which can be processed in this way include cellulose acetate, polysulfones, polyvinylidene fluorides, polyetherimides, and aromatic polyamides.

The properties of normal silicones mean that they cannot be processed by means of the phase inversion process. Silicone membranes are prepared, in all of the processes described, by a multistage, involved, and expensive process. In addition, the preparation of very thin, compact separating layers on the basis of silicones is extremely difficult to accomplish technically. The preparation of porous separation-selective silicone layers is not possible with the methods described in the literature.

McGrath et al. in *Advances in Polymer Science*, 1988, Vol. 86, pp. 1-70 describe a series of different organopolysiloxane/polyurea/polyurethane/polyamide/polyoxalyldiamine copolymers.

Furthermore, Sava et al. in *Revue Roumaine de Chimie*, 2007, Vol. 52, pp. 127-133 describe the preparation of silicone-polyamide copolymers.

SUMMARY OF THE INVENTION

The object was to prepare membranes which have the positive properties of the silicone copolymer membranes but no longer have their stated disadvantages.

The invention provides porous membranes (M) comprising organopolysiloxane/polyurea/polyurethane/polyamide/polyoxalyldiamine copolymers of the general formula (1):

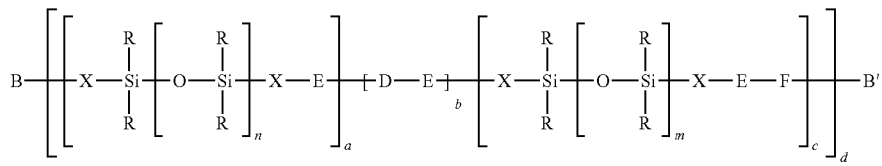

where the structural element E is selected from the general formulae (2a-f)

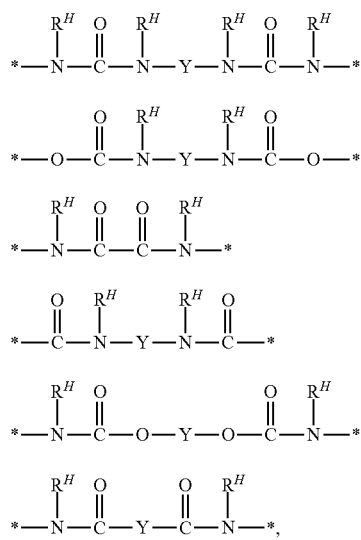

where the structural element F is selected from the general formulae (3a-f)

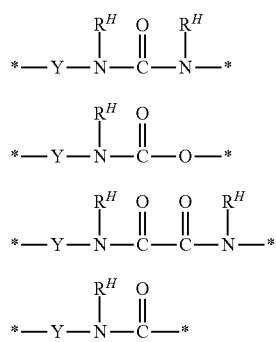

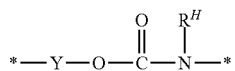

(3e)

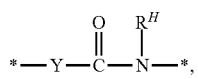

(3f)

where
R is a monovalent, optionally fluorine- or chlorine-substituted hydrocarbon radical having 1 to 20 carbon atoms,
$R^H$ is hydrogen or a monovalent, optionally fluorine- or chlorine-substituted hydrocarbon radical having 1 to 22 carbon atoms,
X is an alkylene radical having 1 to 20 carbon atoms, in which nonadjacent methylene units may be replaced by groups —O—, or is an arylene radical having 6 to 22 carbon atoms,
Y is a divalent, optionally fluorine- or chlorine-substituted hydrocarbon radical having 1 to 20 carbon atoms,
D is an optionally fluorine-, chlorine-, $C_1$-$C_6$-alkyl- or $C_1$-$C_6$-alkyl ester-substituted alkylene radical having 1 to 700 carbon atoms, in which nonadjacent methylene units may be replaced by groups —O—, —COO—, —COO— or —OCOO—, or is an arylene radical having 6 to 22 carbon atoms,
B and B' are each a reactive or nonreactive end group which is bonded covalently to the polymer,
m is an integer from 1 to 4000,
n is an integer from 1 to 4000,
a is an integer of at least 1,
b is an integer from 0 to 40,
c is an integer from 0 to 30, and
d is an integer greater than 0,
with the proviso that at least 10% of the radials $R^H$ are hydrogen.

DETAILED DESCRIPTION OF PREFERRED EMBODIMENTS

The invention is based on the finding that the organopolysiloxane/polyurea/polyurethane/polyamide/polyoxalyldiamine copolymers are suitable for preparing membranes (M), especially for preparing asymmetrically constructed membranes (M), which have a substantially better mechanical stability and a substantially better permeation behavior than the corresponding nonporous membranes recited in the literature.

Through the processing of the organopolysiloxane/polyurea/polyurethane/polyamide/polyoxalyldiamine copolymers by means of the phase inversion process it is possible to prepare the membranes (M) easily and inexpensively with a sufficient mechanical stability and a high flow rate. High mechanical stability on the part of the membranes (M), however, with respect inter alia to the pressure of the mixture to be separated, is vital for technical deployment of the membranes (M). Particularly when membranes are used in reverse osmosis, ultrafiltration, nanofiltration and microfiltration, and also gas separation and pervaporation units, membranes are needed which are able to withstand very high mechanical loads.

In addition, the amide moieties present in the polymer of the copolymers ensure sufficient physical crosslinking of the membranes (M) via hydrogen bonds following phase inversion. The flexibility is retained in this process. Possible collapse of the porous structures after the phase inversion process, even at relatively high temperatures, has not been observed. In the majority of cases, costly and inconvenient additional crosslinking is superfluous. Furthermore, the amide moieties of the organopolysiloxane/polyurea/polyurethane/polyamide/polyoxalyldiamine copolymers modify the diffusion and solubility of the molecules to be separated, leading, in the majority of cases, to an improvement in the selectivity of the membranes (M) as compared with pure silicones. As compared with membranes of the prior art, the membranes (M) have a significantly higher flow rate and significantly improved mechanical properties, in conjunction with the same level of material deployment and a more simple preparation.

Although the selectivities of the silicones known in the literature appear sufficient in some cases for the separation of gas mixtures, the attainable gas flows through the membranes are too low, and this has a strongly negative influence on their overall performance and hence also greatly hinders their technical deployment.

Furthermore, the pore structure of the membranes (M) can be easily varied within a wide range. By this means it is also possible to realize membrane applications, such as microfiltration or else $H_2O$/vapor/$H_2O$ liquid separation, for example, which were not achievable with the silicone copolymer membranes prepared to date.

It is also possible, in comparison to the majority of commercial membranes, to separate even hydrophobic media with ease.

Overall, therefore, relative to pure silicone membranes or other silicone copolymer membranes, the porous membranes (M) comprising organopolysiloxane/polyurea/polyurethane/polyamide/polyoxalyldiamine copolymers have a significantly improved profile of properties in relation to very important membrane properties.

A further feature of the membranes (M) is that they have an excellent shelf life. This means that, after a storage time of 4 months, the membranes (M) exhibit no significant changes in separation performance.

Preferably R denotes a monovalent hydrocarbon radical, more particularly alkyl radical having 1 to 6 carbon atoms, more particularly unsubstituted. Particularly preferred radicals R are methyl, ethyl, vinyl, and phenyl.

Preferably $R^H$ denotes hydrogen or a monovalent alkyl radical having 1 to 6 carbon atoms or an aryl radical having 6 to 22 carbon atoms, more particularly unsubstituted. Particularly preferred radicals $R^H$ are methyl, ethyl, n-propyl, isopropyl, and phenyl.

Preferably X denotes an alkylene radical having 2 to 10, more particularly 3 to 6, carbon atoms. Preferably the alkylene radical X is not interrupted.

Preferably Y denotes a hydrocarbon radical having 3 to 13 carbon atoms which is preferably unsubstituted. Preferably Y denotes an aralkylene, alkylaryl or linear or cyclic alkylene radical.

Preferably D denotes an alkylene radical having at least 2, more particularly at least 4, carbon atoms and not more than 12 carbon atoms. Likewise preferably D denotes a polyoxyalkylene radical, more particularly polyoxyethylene radical or polyoxypropylene radical, having at least 20, more particularly at least 100, carbon atoms and not more than 800, more particularly not more than 200, carbon atoms. Preferably the radical D is unsubstituted.

B denotes preferably a functional or nonfunctional organic or silicon-organic radical. For example, B denotes an organosilyl group, such as alkylsilyl, alkoxysilyl or oximosilyl group, for example, more particularly having 1 to 4 carbon atoms, such as, for example, methoxysilyl or ethoxysilyl group, a hydrogen, or an acyl group, which are joined to the polymer via covalent bonds. B may further denote a free-radically or ionically polymerizable radical, such as, for example, a vinyl, acryloyl, methacryloyl, acrylamide or methacrylamide radical, or else an epoxide radical, such as propylene oxide radical, for example. Furthermore, B may denote an optionally substituted alkyl group having preferably 1 to carbon atoms, an optionally substituted aryl group having preferably 6 to 22 carbon atoms or alkylaryl group, which may be substituted or unsubstituted. With particular preference B is a methoxysilyl group, ethoxysilyl group, a hydrogen, an aminoalkyl group or an isocyanate-containing group. Furthermore, B may denote an isocyanate radical.

B' denotes preferably a functional or nonfunctional organic or silicon-organic radical. For example, B' denotes an organosilyl group, a hydrogen, an aminoalkyl group, a hydroxyl group or an NCO group, which are joined to the polymer via covalent bonds. B' may further denote a free-radically or ionically polymerizable radical, such as, for example, a vinyl, acryloyl, methacryloyl, acrylamide or methacrylamide radical, or else an epoxide radical, such as propylene oxide radical, for example. Furthermore, B' may denote an optionally substituted alkyl group having preferably 1 to 20 carbon atoms, an optionally substituted aryl group having preferably 6 to carbon atoms or alkylaryl group, which may be substituted or unsubstituted. With particular preference B' is a methoxysilyl group, ethoxysilyl group, a hydrogen, an aminoalkyl group, a hydroxyl group or an isocyanate-containing group.

n and m preferably denote a number of at least 3, more preferably at least 15, more particularly at least 40, and preferably not more than 800, more preferably not more than 400, more particularly not more than 250.

Preferably a denotes a number of not more than 50.

If b is other than 0, b preferably denotes a number of not more than 50, more particularly not more than 25.

c denotes preferably a number of not more than 10, more particularly not more than 5.

Preferably at least 30%, more preferably at least 60%, of the radicals $R^H$ denote hydrogen.

To an extent of at least 50%, more preferably at least 80%, more particularly at least 90%, even more preferably at least 95%, the porous membranes (M) are preferably composed of organopolysiloxane/polyurea/polyurethane/polyamide/polyoxalyldiamine copolymers of the general formula (1).

Characteristic of membranes prepared by the phase inversion process, also termed the Loeb-Sourirajan process, is their asymmetric construction, with a thin, separation-selective layer and a porous understructure which provides for mechanical stability. Membranes of this kind are particularly preferred.

The invention also provides a process for preparing the porous membranes (M) from organopolysiloxane/polyurea/ polyurethane/polyamide/polyoxalyldiamine copolymers of the above general formula (1), by the phase inversion process, wherein, from a solution of organopolysiloxane/polyurea/polyurethane/polyamide/polyoxalyldiamine copolymers in solvent (L), a film is produced and the solvent (L)-comprising film is contacted with a precipitating medium (F).

Preferably, subsequently, solvent (L) and precipitating medium (F) are removed by evaporation.

The membranes (M) can of course also be prepared in another way.

The preparation of the membranes (M) by the phase inversion process takes place preferably in a single-stage process. In this case the still solvent (L)-comprising polymer film is immersed into a precipitation bath filled with precipitating medium (F). The precipitating medium (F) is preferably a liquid in which the polymer of the general formula (1) has a solubility of not more than 2% by weight at 20° C. In one preferred embodiment of the invention, the solvent (L) or solvent mixture (L) which was used for preparing the polymer solution dissolves in the precipitating medium (F).

In one particularly preferred embodiment of the invention, the precipitating medium (F) comprises deionized water.

In another preferred embodiment of the invention, the precipitating medium (F) comprises acetonitrile.

For preparing the membranes (M), the organopolysiloxane/polyurea/polyurethane/polyamide/polyoxalyldiamine copolymers are dissolved in an organic or inorganic solvent (L) or mixtures thereof.

Preferred organic solvents (L) are hydrocarbons, halogenated hydrocarbons, ethers, alcohols, aldehydes, ketones, acids, anhydrides, esters, N-containing solvents, and S-containing solvents.

Examples of common hydrocarbons are pentane, hexane, dimethylbutane, heptane, hex-1-ene, hexa-1,5-diene, cyclohexane, terpentine, benzene, isopropylbenzene, xylene, toluene, naphthalene, and also tetrahydronaphthalene. Examples of common halogenated hydrocarbons are fluoroform, perfluoroheptane, methylene chloride, chloroform, carbon tetrachloride, 1,2-dichloroethane, 1,1,1-trichloroethane, pentyl chloride, bromoform, 1,2-dibromoethane, methylene iodide, fluorobenzene, chlorobenzene, and 1,2-dichlorobenzene. Examples of common ethers are diethyl ether, butyl ethyl ether, anisole, diphenyl ether, ethylene oxide, tetrahydrofuran, furan, and 1,4-dioxane. Examples of common alcohols are methanol, ethanol, propanol, butanol, octanol, cyclohexanol, benzyl alcohol, ethylene glycol, ethylene glycol monomethyl ether, propylene glycol, butylglycol, glycerol, phenol, and m-cresol. Examples of common aldehydes are acetaldehyde and butyraldehyde. Examples of common ketones are acetone, diisobutyl ketone, butan-2-one, cyclohexanone, and acetophenone. Common examples of acids are formic acid and acetic acid. Common examples of anhydrides are acetic anhydride and maleic anhydride. Common examples of esters are methyl acetate, ethyl acetate, butyl acetate, phenyl acetate, glycerol triacetate, diethyl oxalate, dioctyl sebacate, methyl benzoate, dibutyl phthalate, and tricresyl phosphate. Common examples of nitrogen-containing solvents are nitromethane, nitrobenzene, butyronitrile, acetonitrile, benzonitrile, malononitrile, hexylamine, aminoethanol, N,N-diethylaminoethanol, aniline, pyridine, N,N-dimethylaniline, N,N-dimethylformamide, N-methylpiperazine, and 3-hydroxypropionitrile. Common examples of sulfur-containing solvents (L) are carbon disulfide, methanethiol, dimethyl sulfone, dimethyl sulfoxide, and thiophene. Common examples of inorganic solvents are water, ammonia, hydrazine, sulfur dioxide, silicon tetrachloride, and titanium tetrachloride.

In one preferred embodiment of the invention, the organopolysiloxane/polyurea/polyurethane/polyamide/polyoxalyldiamine copolymers of the general formula (1) are dissolved in solvent mixtures (L). Common examples of binary solvent mixtures (L) are isopropanol/N-methylpiperazine, isopropanol/aminoethanol, isopropanol/N,N-diethylaminoethanol, isopropanol/dimethylformamide, isopropanol/tetrahydrofuran, and isopropanol/dimethyl sulfoxide. Preference here is given to mixing ratios of 5:1 to 1:5, with particular preference attaching to the range from 4:1 to 1:4, and very preferably the range 3:1 to 1:3.

In a further particularly preferred embodiment of the invention, the organopolysiloxane/polyurea/polyurethane/polyamide/polyoxalyldiamine copolymers of the general formula (1) are dissolved in tertiary solvent mixtures (L). Common examples of tertiary solvent mixtures are isopropanol/N-methylpiperazine/aminoethanol, isopropanol/N-methylpiperazine/dimethylformamide, isopropanol/N-methylpiperazine/tetrahydrofuran, isopropanol/N-methylpiperazine/dimethyl sulfoxide, isopropanol/aminoethanol/dimethylformamide, isopropanol/N-methylpiprazine/N,N-diethylaminoethanol, isopropanol/dimethylformamide/N,N-diethylaminoethanol, isopropanol/aminoethanol/tetrahydrofuran, isopropanol/aminoethanol/dimethyl sulfoxide, and isopropanol/dimethylformamide/dimethyl sulfoxide. Preferred mixing ratios in this case are 3:1:1, 2:1:1, 1:1:1, 1:2:2, and 1:2:3.

Preferred solvents (L) for the organopolysiloxane/polyurea/polyurethane/polyamide/polyoxalyldiamine copolymers dissolve in the precipitant (F) for the phase inversion. Suitable solvent pairings (L) are water/isopropanol, water/tetrahydrofuran, water/dimethylformamide, water/N-methylpiperazine, water/dimethyl sulfoxide, water/aminoethanol, water/N,N-diethylaminoethanol, and also the binary and tertiary solvent mixtures (L) described.

In one embodiment of the invention, the copolymer of the general formula (1) is introduced first and then the solvent or solvent mixture (L) is added.

In one preferred embodiment of the invention, the solvent or solvent mixture (L) is introduced first and then the copolymer of the general formula (1) is added.

In one particularly preferred embodiment, the copolymer of the general formula (1) is introduced first, mixed with N-methylpiperazine, and then dissolved completely with isopropanol.

The concentration of the polymer solution is in a range from 5% to 60% by weight, based on the weight of the copolymer of the general formula (1). In one preferred embodiment of the invention, the concentration of the polymer solution is 10% to 40% by weight. In one particularly preferred embodiment of the invention, the concentration of the polymer solution is in a range from 15% to 30% by weight.

The copolymers of the general formula (1) are dissolved by customary methods, such as stirring, shaking or mixing, for example. With particular preference the copolymers are dissolved by shaking in the solvent (L) or solvent mixture (L).

In another preferred embodiment of the invention, the synthesis of the organopolysiloxane/polyurea/polyurethane/polyamide/polyoxalyldiamine copolymers of the general formula (1) used for preparing the membranes of the invention is carried out in solution. It is thus possible as solvents to use already the solvents (L) which are needed for preparing the membrane. In some cases, therefore, there is no need for costly and inconvenient isolation of the polymer following the synthesis. This reduces the preparation cost and complexity, and the copolymers of the general formula (1) are already in dissolved form.

If the synthesis solution does not have the appropriate concentration, solvent can be added or removed by distillation. Furthermore, of course, additional solvents or additives can also be added after or during the synthesis to the copolymer of the general formula (1) prepared in solution.

By heating the solutions it is possible for the dissolution procedure to be accelerated, in some cases considerably. Preferred temperatures are from 10 to 160° C. Further preferred is the temperature range from 22 to 40° C. Particularly preferred is the preparation of the polymer solution at room temperature.

The solutions are mixed until a homogeneous polymer solution is formed in which the copolymer of the general formula (1) is fully dissolved. The time for this dissolution procedure amounts, for example, to between 5 min and 48 h. In one preferred embodiment of the invention, the copolymers of the general formula (1) dissolve between 1 h and 24 h. In one particularly preferred embodiment of the invention, the copolymers of the general formula (1) dissolve completely in the solvent within from 2 h to 8 h.

In one embodiment of the invention, further additives are added to the polymer solution. Typical additives are inorganic salts, and polymers that are soluble in the precipitating medium (F). Common inorganic salts are LiF, NaF, KF, LiCl, NaCl, KCl, $MgCl_2$, $CaCl_2$, $ZnCl_2$, and $CdCl_2$. In one preferred embodiment of the invention, water-soluble polymers are added to the polymer solution. Common water-soluble polymers are poly(ethylene glycols), poly(propylene glycols), poly(propylene ethylene glycols), poly(vinylpyrrolidines) poly(vinyl alcohols), and sulfonated polystyrenes.

A major fraction of the additives dissolves in the precipitating medium (F) on phase inversion and is no longer present in the membrane (M). Residues of the additives, still remaining in the membrane following the preparation, may make the membrane overall more hydrophilic.

Mixtures of different additives can also be incorporated into the polymer solution. Thus, in one particularly preferred embodiment of the invention, 2% by weight of LiCl and 3% by weight of poly(vinylpyrrolidine) are added to the polymer solution. The additives make the membrane (M) significantly more porous after the phase inversion process.

The concentration of the additives in the polymer solution is between 0.01% by weight and up to 50% by weight. In one preferred embodiment of the invention, the concentration is 0.1% by weight to 15% by weight. In one particularly preferred embodiment of the invention, the concentration of the additives is 1% to 5% by weight.

The polymer solutions for preparing the membranes (M) may comprise, furthermore, the adjuvants and additives that are customary in formulations. These would include, among others, flow control assistants, surface-active substances, adhesion promoters, light stabilizers such as UV absorbers and/or free-radical scavengers, thixotropic agents, and also other solids and fillers. Adjuvants of these kinds are preferred in order to generate the particular desired profile of properties of the membranes (M).

In one preferred embodiment of the invention, the solutions for preparing the membranes (M) comprise fungicides or bactericides, such as methylisothiazolones or benzisothiazolones. By this means the formation of organic deposits on the membranes (M) can be prevented.

In a likewise preferred embodiment of the invention, the porous membranes (M) further comprise a fraction of particles.

Particle-filled porous membranes (M) of organopolysiloxane/polyurea/polyurethane/polyamide/polyoxalyldiamine copolymers are especially suitable for use as membranes in plants for separating water from compressed air systems.

The particles that are preferably used are distinguished by an average particle size, measured as the average hydrodynamic equivalence diameter in the form of the Z-average by photon correlation spectroscopy, of less than 1000 μm, preferably 100 μm to 10 μm, and more preferably from 1 μm to 10 nm.

The particles in this context may be distributed homogeneously or have a distribution gradient in the membranes (M). Depending on the application, not only a homogeneous distribution but also a nonuniform distribution of the particles may have advantageous consequences for mechanical stability, the permeability of gases and liquids, and the size selection.

Based on the total weight, the membranes (M) preferably have a particles content of 0%-90% by weight, preferably between 0%-40% by weight, more preferably 0%-30% by weight, and very preferably 0%-20% by weight. The membranes (M) in this case may comprise one or more different types of particles, examples being silicon dioxide and also aluminophosphate.

Suitable particles, on grounds of technical manageability, include oxides with a covalent bonding component in the metal-oxygen bond, preferably oxides of main group 3, such as boron, aluminum, gallium or indium oxides, of main group 4, such as silicon dioxide, germanium dioxide, tin oxide, tin dioxide, lead oxide, lead dioxide, or oxides of transition group 4, such as titanium oxide, zirconium oxide, and hafnium oxide. Other examples are oxides of nickel, of cobalt, or iron, of manganese, of chromium, and of vanadium.

Suitability is possessed, moreover, by metals with an oxidized surface, zeolites (a listing of suitable zeolites is found in: Atlas of Zeolite Framework Types, 5th edition, Ch. Baerlocher, W. M. Meier, D. H. Olson, Amsterdam: Elsevier 2001), silicates, aluminates, aluminophosphates, titanates, and aluminum phyllosilicates (e.g., bentonites, montmorillonites, smectites, hectorites), the particles preferably having a specific surface area of at least 0.1, more preferably at least 10 $m^2$/g and not more than 1000, more preferably not more than 500 $m^2$/g (measured by the BET method in accordance with DIN 66131 and 66132). The particles, which preferably have an average diameter of less than 10 μm, more preferably less than 1000 nm, may be present in the form of aggregates (defined as per DIN 53206) and agglomerates (defined as per DIN 53206), which depending on the external shearing load (brought about, for example, by the measurement conditions) may have sizes of 1 to 1000 μm.

Particularly preferred as particles is fumed silica, prepared in a flame reaction from organosilicon compounds, being prepared, for example, from silicon tetrachloride or methyldichlorosilane, or hydrotrichlorosilane or hydromethyldichlorosilane, or other methylchlorosilanes or alkylchlorosilanes, alone or in a mixture with hydrocarbons, or any desired volatilizable or sprayable mixtures of organosilicon compounds, as stated, and hydrocarbons, in an oxygen-hydrogen flame, for example, or else in a carbon monoxide-oxygen flame. The silica may be prepared optionally with or without addition of water, in the purification step, for example; it is preferred not to add water.

Fumed, or pyrogenically prepared, silica or silicon dioxide is known, for example, from Ullmann's Enzyklo-padie der Technischen Chemie, 4th edition, volume 21, page 464.

The fumed silica has a specific BET surface area, measured in accordance with DIN EN ISO 9277/DIN 66132, of 10 m²/g to 600 m²/g, preferably of 50 m²/g to 400 m²/g.

The fumed silica preferably has a tapped density, measured in accordance with DIN EN ISO 787-11, of 10 g/l to 500 g/l, more preferably of 20 g/l to 200 g/l, and very preferably of 30 g/l to 100 g/l.

The fumed silica preferably has a fractal surface dimension of preferably less than or equal to 2.3, more preferably of less than or equal to 2.1, with particular preference of 1.95 to 2.05, the fractal surface dimension $D_s$ being defined here as follows:
Particle surface area A is proportional to particle radius R to the power of $D_s$.

The silica preferably has a fractal mass dimension $D_m$ of preferably less than or equal to 2.8, more preferably less than or equal to 2.3, very preferably of 1.7 to 2.1, as given, for example, in F. Saint-Michel, F. Pignon, A. Magnin, *J. Colloid Interface Sci.* 2003, 267, 314. The fractal mass dimension $D_m$ is defined here as follows: Particle mass M is proportional to particle radius R to the power of $D_m$.

The unmodified silica preferably has a density of surface silanol groups SiOH of less than 2.5 SiOH/nm², preferably less than 2.1 SiOH/nm², more preferably of less than 2 SiOH/nm², very preferably of 1.7 to 1.9 SiOH/nm², determined in accordance with a method as given in G. W. Sears, Anal. Chem. 28 (1956) 1981.

Silicas prepared by a wet-chemical route, or silicas prepared, at high temperature (>1000° C.), may be used. Particular preference is given to pyrogenically prepared (fumed) silicas. Hydrophilic silicas may also be used that come freshly prepared directly from the burner, have been stored in the interim, or have already been placed in the customary commercial packaging. It is also possible to use hydrophobicized metal oxides or silicas, e.g., commercial silicas.

Mixtures of different metal oxides or silicas can be used, as for example mixtures of metal oxides or silicas with different BET surface areas, or mixtures of metal oxides with different degrees of hydrophobicization or silylation.

In a further preferred embodiment of the invention, colloidal silicon oxides or metal oxides are used as particles, and are present generally as a dispersion of the corresponding oxide particles, of submicron size, in an aqueous or organic solvent. Oxides which can be used in this context include the oxides of the metals aluminum, titanium, zirconium, tantalum, tungsten, hafnium, and tin, or the corresponding mixed oxides. Silica sols are particularly preferred. Examples of commercially available silica sols which are suitable for producing the particles (PS) are silica sols of the product series LUDOX® Grace Davison), Snowtex® (Nissan Chemical), Klebosol® (Clariant), and Levasil® (H. C. Starck), or silica sols of the kind preparable by the Stöber process.

Another preferred embodiment of the invention uses, as particles, organopolysiloxanes of the general formula [4]

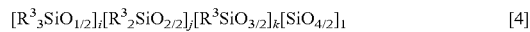  [4]

where
$R^3$ is an OH function, an optionally halogen-, hydroxyl-, amino-, epoxy-, phosphonato-, thiol-, (meth)acryloyl-, carbamate- or else NCO-substituted hydrocarbon radical having 1-18 carbon atoms, it being possible for the carbon chain to be interrupted by nonadjacent oxygen, sulfur or $NR^{3'}$ groups,
$R^{3'}$ has the definitions of $R^H$,
i, and j are each an integral value greater than or equal to 0,
k and l are each an integral value greater than 0,
with the proviso that i+j+k+l is greater than or equal to 3, more particularly at least 10.

Furthermore, in order to improve compatibility with the polymer matrix, the particles used may also carry an additional surface functionalization.

Common functional groups for modifying the particles in this context are charged neutrally, anionically, basically or zwitterionically. The compounds used for the modification, preferably alkoxysilanes, have—for example—alkyl, aryl, amino, thiol, carboxylic acid, sulfonic acid, halogen, epoxy, hydroxyl, phosphonato, (meth)acryloyl or isocyanate groups.

The compounds that are used for modifying the particles are employed preferably in an amount of greater than 1% by weight (based on the particles), more preferably greater than 5% by weight, very preferably greater than 8% by weight.

For the preparation of the membranes (M), the polymer solutions described are preferably applied to a substrate or spun. The polymer solutions applied to substrates are processed further to form flat membranes, while the spun polymer solutions are fabricated into hollow fiber membranes.

In one preferred embodiment of the invention, the polymer solutions are applied to a substrate by knife application.

It has emerged as being particularly advantageous to filter the polymer solution prior to knife application, using conventional filter cartridges. In this step, large particles are removed that can lead to defects at the membrane preparation stage. The pore size of these filters is preferably 0.2 µm to 100 µm. Preferred pore sizes are 0.2 µm to 50 µm. Particularly preferred pore sizes are 0.2 to 10 µm.

The height of the polymer film is influenced substantially by the gap height of the knife that is used. The gap height of the knife is preferably at least 1 µm, more preferably at least 20 µm, more particularly at least 50 µm, and preferably not more than 2000 µm, more preferably not more than 500 µm, in particular not more than 300 µm. In order to prevent running of the polymer film following knife application, the knife height set ought not to be too high.

There is in principle no limit on the width of the knife application. Typical widths are situated in the range from 5 cm to 2 m. In one preferred embodiment of the invention, the knife width is at least 10 cm and not more than 1 m, more particularly not more than 50 cm.

A further possibility for preparing the wet polymer film is the meniscus coating of an appropriate substrate with the polymer solution. Other possibilities for preparing the polymer films include all customary techniques, examples being casting, spraying, screen printing, gravure printing, and spin-on-disk.

The film thickness is set by the viscosity of the polymer solution and by the film-forming rate.

The application speed must in principle be selected such that the polymer solution is able to wet the substrate, so that there are no running defects during film production. Typical speeds in this context are preferably at least 1 cm/s, more preferably at least 1.5 cm/s, more particularly at least 2.5 cm/s, and preferably not more than 1 m/s, more preferably not more than 0.5 m/s, more particularly not more than 10 cm/s.

In one preferred embodiment of the invention, application takes place at temperatures above 20° C. In one particularly preferred embodiment of the invention, application takes place in a temperature range from 25 to 50° C.

In principle there are a number of possibilities for adjusting the temperature. Not only the polymer solutions prepared but also the substrates used may be adjusted to the temperature. In some cases it may be of advantage to heat not only the polymer solution but also the substrate to the desired temperature.

In one preferred embodiment of the invention, the polymer solution is heated at 40° C. to 60° C. and applied to the substrate which is set at 20° C. to 25° C.

Suitable substrates for the polymer films described are in principle all even surfaces. Particularly suitable substrate materials are metals, polymers, and glasses. Suitable metals consist of titanium, iron, copper, aluminum, and alloys thereof.

All polymers that can be processed to films or nonwovens may be used as substrates. Examples of polymers of this kind are polyamides, polyimides, polyetherimides, polycarbonates, polybenzimidazoles, polyethersulfones, polyesters, polysulfones, polytetrafluoroethylenes, polyurethanes, polyvinyl chlorides, polyetherglycols, polyethylene terephthalate (PET), polyaryletherketones, polyacrylonitrile, polymethyl methacrylates, polyphenylene oxides, polycarbonates, polyethylenes, polypropylenes, and their possible copolymers.

As glass substrates it is possible to use all common glasses. Examples include quartz glass, lead glass, float glass or soda-lime glass.

The materials described may be present in the form of plates, films, nets, woven and non-woven, and also as nonwoven webs. In the case of the preparation of the membranes on woven or non-woven nets, and also on nonwoven fabrics, the spacer is already joined to the membrane.

In one preferred embodiment of the invention, the polymer film is applied to a PET film with a layer thickness of 100 µm to 50 µm. In a likewise preferred embodiment of the invention, the polymer film is prepared on a glass plate with a layer thickness of 0.5 to 1.5 mm.

In one particularly preferred embodiment of the invention, the porous membrane is applied to nonwoven fabrics. These membrane/nonwoven composite materials result in time savings and low manufacturing costs in the subsequent manufacture of the membrane modules.

The preferred preparation of the porous membranes on the nonwoven fabrics breaks down into the application of the still-wet polymer film to the nonwoven, with subsequent phase inversion with the precipitating medium (F).

Particularly preferred are nonwoven fabrics which have no defects, such as holes or upright fibers, for example, on the surface.

The porous membrane may be applied both to non-woven and to woven web fabrics.

In one preferred embodiment of the invention, the porous membrane is applied to a non-woven web.

Preferred materials for the nonwoven fabrics used are polyesters, polyethylenes, polypropylenes, polyethylene/polypropylene copolymers or polyethylene terephthalates.

In one particularly preferred embodiment of the invention, the porous membrane (M) is applied to a non-woven polyester web.

In another preferred embodiment of the invention, the porous membrane (M) is applied to a glass fiber web, carbon fiber web or aramid fiber web.

The layer thickness of the substrates for the porous membrane (M) is guided by the technical circumstances of the coating unit, and is preferably at least 10 µm, more preferably at least 50 µm, more particularly at least 100 µm, and preferably not more than 2 mm, more preferably not more than 600 µm, more particularly not more than 400 µm.

The substrates used for preparing the membranes may have been surface-treated with additional substances. These might include, among others, flow control assistants, surface-active substances, adhesion promoters, light stabilizers such as UV absorbers and/or free-radical scavengers. In one preferred embodiment of the invention, the films are additionally treated with ozone or with UV light. Adjuvants of these kinds are preferred in order to generate the particular desired profiles of properties in the membranes.

In a further preferred embodiment of the invention, the organopolysiloxane/polyurea/polyurethane/polyamide/polyoxalyldiamine copolymers of the general formula (1) are processed to hollow fibers by spinning.

The external diameter of the fiber is preferably at least 10 µm, more preferably at least 100 µm, more particularly at least 200 µm, even better at least 300 µm, and preferably not more than 5 mm, more preferably not more than 2 mm, more particularly not more than 1000 µm.

The maximum internal diameter of the hollow fiber is limited by the maximum external diameter, and is preferably at least 8 µm, more preferably at least 80 µm, more particularly at least 180 µm, even better at least 280 µm, and preferably not more than 4.5 mm, more preferably not more than 1.9 mm, more particularly not more than 900 µm.

In order to prevent the collapse of the internal channels during the hollow fiber manufacturing process, a further medium may be injected into this channel.

The medium comprises either gases or liquids.

Examples of typical gaseous media are air, compressed air, nitrogen, oxygen or carbon dioxide.

Examples of typical liquid media are water or organic solvents. Preferred organic solvents are hydrocarbons, halogenated hydrocarbons, ethers, alcohols, aldehydes, ketones, acids, anhydrides, esters, N-containing solvents, and S-containing solvents.

Through the appropriate selection of the precipitating medium (F) and of the medium applied in the interior of the hollow fiber, the phase inversion may take place only from the outside, only from the inside, or from both sides simultaneously. Accordingly, in the hollow fiber membrane, the separation-selective layer may be formed on the outside, on the inside or in the hollow fiber wall.

In one preferred embodiment of the invention, water is used as precipitating medium (F) and toluene is injected in the interior of the hollow fiber.

A further possibility for preventing the collapse of the hollow fibers is to use flexible tubes of nonwoven web. In this case, as in the case of the substrate-bound membranes, the polymer solution is applied to the outside or to the inside of the flexible tube.

In the production of hollow fibers it is likewise possible to co-spin a second polymer ply.

Particular preference is given to spinning at elevated temperatures. In this way it is possible to increase the speed for the production of the hollow fibers. Typical temperatures in this case are above 20° C. Particular preference is given to spinning at temperatures of 20° C. to 150° C. In one particularly preferred embodiment of the invention, the hollow fibers are produced at 45 to 55° C.

For the preparation of the membranes (M), the films or hollow fibers may be subjected to preliminary drying for a defined time before being immersed into the precipitation bath.

Preliminary drying may take place under ambient conditions. In certain cases it may be advantageous to carry out the preliminary drying at defined ambient conditions, i.e., temperature and relative humidity. The temperature in this context is preferably at least 0° C., more preferably at least 10° C., more particularly at least 25° C., and preferably not more than 150° C., more preferably not more than 0-100° C.

The length of the preliminary drying time depends on the ambient conditions. The preliminary drying time is customarily longer than 5 seconds.

In one preferred embodiment of the invention, the preliminary drying time is 7 seconds to 10 minutes.

In one particularly preferred embodiment of the invention, the preliminary drying time is 10 to 30 seconds.

In a likewise preferred embodiment of the invention, the preliminary drying time is 30 to 1 minute.

The polymer films and hollow fibers described are immersed, following their production, into a precipitation bath filled with precipitating medium (F).

The most common precipitating medium (F) is water. For the preparation of the membranes (M), water is also the preferred precipitating medium. Other preferred precipitating media (F) are alcohols, e.g., methanol, ethanol, isopropanol, and longer-chain alcohols, or N-containing solvents, such as acetonitrile, for example. In addition, however, the solvents and solvent mixtures described for the preparation of the polymer solution are suitable in principle as precipitating medium (F). In this context, however, it should always be ensured that the organopolysiloxane/polyurea/polyurethane/polyamide/polyoxalyldiamine copolymer used does not dissolve fully in the precipitating medium (F).

The temperature of the precipitating medium (F) may exert a large influence over the structure of the membrane (M). The temperature of the precipitating medium (F) for preparing the membranes (M) lies between the melting temperature and the boiling temperature of the precipitating medium (F) used. The temperature is preferably in a range from 0° C. to 80° C. More preferably the temperature is in a range from 0° C. to 30° C. In one particularly preferred embodiment of the membranes (M), the temperature of the precipitating medium (F) is 23 to 26° C.

The precipitating medium (F) may in addition also include additives which influence the precipitation of the polymer in the precipitation bath. Typical additives to the precipitating medium (F) in this case are inorganic salts, and polymers that are soluble in the precipitating medium (F). Common inorganic salts are LiF, NaF, KF, LiCl, NaCl, KCl, $MgCl_2$, $CaCl_2$, $ZnCl_2$, and $CdCl_2$. One preferred embodiment of the invention adds water-soluble polymers to the precipitating medium (F). Common water-soluble polymers are poly(ethylene glycols), poly(propylene glycols), poly(propylene ethylene glycols), poly(vinylpyrrolidines), poly(vinyl alcohols), and sulfonated polystyrenes. The precipitating medium (F) may, moreover, receive the adjuvants and additives that are customary in solutions. Examples include flow control assistants, surface-active substances, adhesion promoters, light stabilizers such as UV absorbers and/or free-radical scavengers.

The majority of the additives is no longer present in the membrane after preparation. Additives which remain in the membrane (M) after preparation may make the membrane (M) more hydrophilic.

Mixtures of different additives may also be incorporated into the precipitating medium (F). Thus, in one particularly preferred embodiment of the invention, 0.3% to 0.8% by weight of dodecyl sulfate and 0.3% to 0.8% by weight of LiF are added to the precipitation bath.

The concentration of the additives in the precipitating medium (F) is preferably at least 0.01% by weight, more preferably at least 0.1% by weight, more particularly at least 1% by weight, and preferably not more than 30% by weight, more preferably not more than 15% by weight, more particularly not more than 5% by weight.

Additives of this kind are preferred in order to generate the particular desired profiles of properties of the membranes (M).

The rate at which the polymer film and/or the hollow fiber is immersed into the precipitating medium (F) must in principle be selected such that the solvent exchange that is necessary for membrane preparation can take place. Typical immersion rates are preferably at least 1 cm/s, more preferably at least 2 cm/s, more particularly at least 5 cm/s, even better at least 10 cm/s, and preferably not more than 1 m/s, more preferably not more than 50 cm/s, more particularly not more than 30 cm/s.

The rate is preferably set such that the membranes (M) are prepared continuously. In a process of this kind, the generation of the wet polymer film takes place preferably at the same rate as the immersion into the inversion bath. The time between polymer film production and immersion into the precipitating medium (F) is set such that the polymer film passes through the time that may be necessary for preliminary drying.

The angle at which the polymer film and/or the hollow fiber is immersed into the precipitating medium (F) must in principle be selected such that solvent exchange is not blocked. Typical angles are preferably at least 1°, more preferably at least 10°, more particularly at least 15°, and preferably not more than 90°, more preferably not more than 70°, more particularly not more than 45°. Hollow fibers are preferably immersed at an angle of 85° to 90° into the precipitating medium (F).

The length of time for which the film is held in the precipitating medium (F) must in principle be selected such that sufficient time is present until solvent, exchange has taken place. Typical times in this context are preferably at least 10 s, more preferably at least 30 s, more particularly at least 1 min, and preferably not more than 20 h, more preferably not more than 60 min, more particularly not more than 30 min. In one particularly preferred embodiment of the membranes (M), a holding time of 3 to 7 min is used.

Where, following the preparation process, membranes (M) still contain unwanted residues of aqueous or organic solvents from solvent (L) or precipitating medium (F), the corresponding solvents are removed following the preparation of the membranes (M). The removal of the solvent in this context is accomplished preferably by evaporation of the solvent.

After being held in the precipitating medium (F), the membrane (M) may either be used directly or be subjected to a further aftertreatment. The purpose of the aftertreatment is to optimize the stability and/or properties of the membrane (M) for the particular separation application. Typical methods in this context are thermal treatment, irradiation, and surface modification of the membranes (M). The thermal treatment may take place in air, in a nonoxidizing environment, or in a solvent, water for example. Sources of radiation which exist for the treatment of the membranes (M) include, for example, gamma radiation, X-rays, microwave radiation, and actinic radiation. The radiation dose must always be tailored specifically to the desired property modification. In one preferred embodiment of the invention, the membranes (M) prepared are dried in air at 50° C. for 10 h.

In one preferred embodiment of the invention, the membranes (M) prepared are put in a medium. This prevents possible collapse of the pore structure. In one particularly preferred embodiment of the invention, the membranes (M) prepared are put into glycol. In a likewise preferred embodiment of the invention, the membranes (M) prepared are treated with gamma radiation, resulting in a further cross-linking of the organopolysiloxane/polyurea/polyurethane/polyamide/polyoxalyldiamine copolymers. The stability of the membranes (M) in aggressive environments, is improved accordingly.

A further customary method of modifying or functionalizing the membranes (M) is the treatment of the membranes (M) with high or low pressure plasma.

By holding the membranes (M) in a plasma, the membranes may, for example, be subsequently sterilized, cleaned or etched with masks.

Additionally preferred likewise is the modification of the membrane surface properties. In this context, depending on the plasma technique used, the surface may be hydrophobicized or hydrophilicized.

The flat membranes and hollow fiber membranes (M) prepared by the phase inversion process have a layer thickness of preferably at least 0.1 µm, more preferably at least 1 µm, more particularly at least 10 µm, even better at least 50 µm, and preferably not more than 2000 µm, more preferably not more than 1000 µm, more particularly not more than 500 µm, better still not more than 250 µm. In one particularly preferred embodiment of the invention, the layer thickness of the membrane (M) is 50 to 80 µm.

The membranes (M) following their preparation have a porous structure. The free volume in this case, depending on the choice of preparation parameters, is at least 5% by volume and not more than up to 99% by volume, based on the density of the pure copolymer of the general formula (1). Preference is given to membranes (M) having a free volume of at least 20% by volume, more preferably at least 30% by volume, more particularly at least 35% by volume, and preferably not more than 90% by volume, more preferably not more than 80% by volume, more particularly not more than 75% by volume.

The membranes (M) possess in principle an anisotropic construction. A relatively compact outer layer follows an increasingly more porous polymer scaffold. This structure specifically is novel, and was not to have been expected, for organopolysiloxane/polyurea/polyurethane/polyamide/polyoxalyldiamine copolymers of the general formula (1).

The selective outer layer may be closed, meaning that there are no pores>1000 Å, which is necessary for use as gas separation membrane, with a pore size of less than 100 Å, as membrane for nanofiltration, with a pore size of less than 20 Å, as membrane for reverse osmosis, with a pore size of less than 10 Å, or as membrane for pervaporation. In the case of closed, separation-selective layers, the thickness is preferably at least 10 nm, more preferably at least 100 nm, more particularly at least 500 nm, and preferably not more than 200 µm, more preferably not more than 100 µm, more particularly not more than 20 µm.

Any defects present that might adversely influence the separation performance of the membranes (M) can be closed by means of what is called a topcoat. Preferred polymers possess a high gas permeability. Particularly preferred polymers are polydimethylsiloxanes. Another possibility for closing defects on the surface is through thermal treatment of the surfaces. The polymer on the surface melts and thus closes the defects.

The invention further provides for the application of the porous membranes (M) for separating mixtures. Typical compositions of the mixtures to be separated include solid/solid, liquid/liquid, gaseous/gaseous, solid/liquid, solid/gaseous, and liquid/gaseous mixtures. Tertiary mixtures as well can be separated with the membranes (M).

The membranes (M) are preferably used to separate gaseous/gaseous, liquid/solid, and liquid/liquid mixtures. Separation in these cases is accomplished preferably in a single-stage operation or in what are called hybrid operations, i.e., two or more separation steps in series. By way of example, liquid/liquid mixtures are first purified by distillation and then are separated further by means of the porous membranes (M). The membranes (M) can be used in all membrane processes. Examples of typical membrane processes are reverse osmosis, gas separation, pervaporation, nanofiltration, ultrafiltration, and microfiltration.

The membranes (M) are prepared, by selection of the appropriate production parameters, in such a way as to produce the pore structure necessary for the particular application. A compilation of the approximate pore diameters for the respective application is given in table 1.

TABLE 1

Overview of the pore diameters typical for the particular membrane application

| Application | Pore diameter/Å |
| --- | --- |
| Reverse osmosis | 1-10 |
| Gas separation | 1-10 |
| Pervaporation | 1-10 |
| Nanofiltration | 5-20 |
| Ultrafiltration | 20-1000 |
| Microfiltration | >500 |

In one preferred embodiment of the invention, membranes (M) having a closed, selective layer are obtained, i.e., the pore sizes are preferably in a range of 1-10 Å, suitable with particular preference for the separation of gas mixtures. The anisotropic construction of the membranes (M) allows a significant increase in flow and, in association therewith, in performance, as compared with compact, nonporous silicone membranes. For the separation of gas mixtures, therefore, significantly low quantities of energy are required. Furthermore, the preparation of the membranes (M) is much more simple than the present state of the art. There is no need for complicated multilayer composite membranes with a substrate and a further coating. The membranes (M), accordingly, can be produced much more quickly and more favorably, as is absolutely necessary for the technical deployment, of such membranes (M).

Furthermore, the porous membranes (M) comprising organopolysiloxane/polyurea/polyurethane/polyamide/polyoxalyldiamine copolymers of the general formula (1) have favorable selectivities with regard to the gas mixtures $CH_4/CO_2$, $CH_4/H_2S$, $CH_4/C_nH_{2n+2}$, and $CH_4/H_2O$, and this is of key importance to their possible deployment as a membrane for the purification of natural gas.

Further typical gaseous/gaseous mixtures which can be separated with the membranes (M) are, for example, $O_2/N_2$, air, $H_2/N_2$, $H_2O$ vapor/air, $H_2/CO$, $H_2/CO_2$, $CO/CO_2$, $H_2/CH_4$, gaseous organic compounds/air, or gaseous organic compounds/$N_2$.

For the separation of volatile organic impurities, known as volatile organic compounds (abbreviation: VOC), in wastewaters, the membranes (M) likewise have favorable separation properties. In this context the membranes (M) are used in what are called pervaporation plants. Typical impurities removable from the wastewaters with the membranes (M) are, for example, benzene, acetone, isopropanol, ethanol, methanol, xylenes, toluene, vinyl chloride, hexane, anilines, butanol, acetaldehyde, ethylene glycol, DMF, DMAC, methyl ethyl ketones, and methyl isobutyl ketone.

In a further preferred embodiment of the invention, the membrane (M) has pores in a range from 1 nm to 100 nm. These structures are suitable for producing ultrafiltration membranes. Typical applications of the ultrafiltration membranes (M) are the purification of electrocoat material in the automobile industry, protein purification in the food industry, as in the production of cheese or clarification of fruit juices, for example, purification of oil/water emulsions, for the cooling and lubrication of workpieces, for example, and the industrial water purification of wastewaters with particulate impurities, examples being latex residues in the wastewater.

In a further preferred embodiment of the invention, the membrane (M) has pores in a range from 100 nm to 10 µm. These membranes (M) are suitable with particular preference for use in microfiltration plants.

Typical applications of the microfiltration membranes (M) are, for example, the removal of bacteria or viruses from water, the sterile filtration of pharmaceutical products, the sterilization of wine and beer, and the preparation of ultrapure, particle-free water for the electrical industry.

In a further preferred embodiment of the invention, the porous membranes (M) are coated on the surface with an additional polymer.

The additional polymer coating is preferably a compact film.

The thickness of the additional coat is guided by the envisaged application for the end membrane. The thicknesses of the coatings are in a range of preferably at least 10 nm, more preferably at least 100 nm, more particularly at least 500 nm, and preferably not more than 500 µm, more preferably not more than 50 µm, more particularly not more than 10 µm.

Suitable materials for the coating include all polymers that can be processed to films. Examples of typical polymers are polyamides, polyimides, polyetherimides, polycarbonates, polybenzimidazoles, polyethersulfones, polyesters, polysulfones, polytetrafluoroethylenes, polyurethanes, silicones, polydimethylsilicones, polymethylphenylsilicones, polymethyloctylsilicones, polymethylalkylsilicones, polymethylarylsilicones, polyvinyl chlorides, polyether glycols, polyethylene terephthalate (PET), polyaryletherketones, polyacrylonitrile, polymethyl methacrylates, polyphenylene oxides, polycarbonates, polyethylenes, polypropylenes, and their possible copolymers.

The polymers may be applied by customary techniques to the membranes (M). Examples of common coating techniques are laminating, spraying, knife coating or adhesive bonding. The membrane (M) must have a surface structure which makes it possible for compact and tightly closed films to be applied. This can be adjusted by—among other means—the pore structure of the membrane (M). In one preferred embodiment of the invention, the additional coating is applied to membranes (M) with pores in a range of 10 nm-5 µm. In one particularly preferred embodiment of the invention, the additional coating is applied to membranes (M) with pores in a range of 100 nm-1 µm.

As a result of the high permeability and the effective film formation on the surface of the membranes (M), membranes (M) can be obtained whose performance is better overall. Both the membrane flow and the selectivity of the membranes (M) can be further improved.

Another application of the membranes (M) is the barrier effect with respect to liquid water in conjunction with water vapor permeability. The membranes (M) can be incorporated, for example, into articles of clothing, such as jackets, for example.

Further examples of applications for the membranes (M) are given, among other references, in Membrane Technology and Applications, second edition, R. W. Baker, New York, Wiley, 2004.

As a result of the anisotropic construction of the membranes (M), the mechanical properties of the films are significantly improved. Hence for membranes of the prior art it is known that pressure fluctuations in the feed streams can cause tearing of the membranes and hence membrane failure. Thin membranes in particular are very susceptible in this respect. Thus, compact silicone membranes with flows comparable to those of the membranes (M) have layer thicknesses of around 1 µm to 10 µm. The mechanical instability of these films is such that they can be furtherprocessed at all only by complicated methods, an example being the application of a thin, compact silicone film to a still surface of water. The construction of complicated multilayer composite membranes is absolutely necessary in this case. Furthermore, as a result of the lamination, there is a risk of detachment of the silicone layer from the substrate.

With the membranes (M) there is no need for auxiliary constructions of this kind, since the membranes, in addition to the compact and thin selective layer, have a porous understructure which gives the membranes (M) sufficient mechanical stability. The membranes (M) can be processed easily and can be processed further even without an additional porous support structure. If it proves to be favorable for specific separation applications, the membranes (M) may likewise be applied to porous structures. This may be done either directly on the support—that is, the polymer film is applied to the substrate and immersed thus into the precipitating medium (F)—or the membrane (M) is prepared and in a further step is laminated onto the support structure.

If desired, adhesion promoters may be used in order to improve further the adhesion of the membranes (M) on the support structures.

The membranes (M) can be installed without problems into membrane modules. Possible in principle in this context is the construction of hollow fiber modules, spiral-wound modules, plate modules, cross flow modules or dead-end modules, depending on the form of the membrane (M) as a flat or hollow fiber membrane, respectively. The membranes (M) are easy to integrate into the sequences of the processes that are customary at present, and are also easily integrated with the components necessary as well as the membrane for the construction of the modules.

All of the above symbols in the above formulae have their definitions in each case independently of one another. In all formulae the silicon atom is tetravalent.

Unless indicated otherwise, all figures for amounts and percentages relate to the weight, all pressures are 0.10 MPa (abs.), and all temperatures are 20° C.

Example 1

Preparation of a Knife-Coating Solution

A solution of 3.85 g of isopropanol is admixed with stirring with 2.3 g of an organopolysiloxane-polyurea copolymer (Geniomer® 200, Wacker Chemie AG). Subsequently a further 3.85 g of NMP (N-methylpyrrolidone) are added to the mixture and the batch as a whole is dissolved on a vertical shaker at room temperature for 16 hours.

This gives a colorless, viscous solution having a solids content of 23% by weight.

Example 2

Preparation of a Knife-Coating Solution

A solution of 3.85 g of isopropanol is admixed with stirring with 2.3 g of an organopolysiloxane-polyurea copolymer (Geniomer® 200, Wacker Chemie AG). Subsequently a further 1.9 g of NMP (N-methylpyrrolidone) and 1.9 g of DEEA (diethylaminoethanol) are added to the mixture and the batch as a whole is dissolved on a vertical shaker at room temperature for 16 hours.

This gives a colorless, viscous solution having a solids content of 23% by weight.

Example 3

Preparation of a Knife-Coating Solution

A solution of 4.15 g of isopropanol is admixed with stirring with 1.7 g of an organopolysiloxane-polyurea copolymer (Geniomer® 200, Wacker Chemie AG). Subsequently a further 2.08 g of NMP (N-methylpyrrolidone) and 2.08 g of DEEA (diethylaminoethanol) are added to the mixture and the batch as a whole is dissolved on a vertical shaker at room temperature for 16 hours.

This gives a colorless, viscous solution having a solids content of 17% by weight.

Example 4

Preparation of a Membrane from the Knife-Coating Solution Prepared in Example 1

For preparing a membrane from the knife-coating solution prepared in example 1, a knife-drawing device was used (Coatmaster 509 MC-I, Erickson).

The film-drawing frame used was a chamber-type coating knife with a film width of 11 cm and a gap height of 300 µm.

The glass plate used as substrate was fixed with the aid of a vacuum suction plate. Prior to knife application, the glass plate was wiped with a clean-room cloth soaked in ethanol. In this way, any particle impurities present were removed.

The film-drawing frame was then filled with the solution and drawn over the glass plate with a constant film-drawing speed of 25 mm/s.

Thereafter, the wet film, still in liquid form, was immersed into the water-filled inversion tank. Solvent exchange and the uniform precipitation of the polymer can be observed visually through the clouding of the film. The time for phase inversion is around 1 minute.

After a total of 25 minutes, the membrane was taken from the tank and dried in air. There were no problems in detaching the membrane from the substrate.

The product is an opaque membrane with a thickness of around 80 µm. Under the scanning electron microscope, the anisotropic structure of the membrane is clearly apparent. The compact, separation-selective outer layer is followed by an open-pored and porous understructure.

The total porosity of the membrane thus prepared is 40% by volume.

Example 5

Preparation of a Membrane from the Knife-Coating Solution Prepared in Example 2

A membrane was prepared, in the same way as in example 4, from the knife-coating solution from example 2.

As in example 4, a membrane was obtained with a thickness of 70 µm, and has a closed, compact outer layer and a porous substructure.

The total porosity of the membrane thus prepared is 30% by volume.

Example 6

Preparation of a Membrane from the Knife-Coating Solution Prepared in Example 3

A membrane was prepared, in the same way as in example 4, from the solution prepared in example 3.

In contrast to the membranes from examples 4 and 5, the membrane prepared here has an open-pored outer layer. The average pore diameter of the separation-selective layer is 0.2 µm. The total porosity of the membrane is approximately 30% by volume.

Example 7

Preparation of a Membrane on a Polyester Web Fabric

In the same way as in example 4, a membrane was produced. In this case, however, the substrate used was a polyester web (Novatexx®, 2415N, Freudenberg).

This gives a porous membrane which is joined firmly to the web fabric and can no longer be removed from the support without destruction.

Example 8

Noninventive, Comparative Example

Production of Compact Films without Porosity

For the production of compact films, 8.0 g of the organopolysiloxane-polyurea copolymer (Geniomer® 200, Wacker Chemie AG) were dissolved in 32 g of isopropanol.

The film was produced using a knife-drawing device (Coatmaster 509 MC-I, Erichson).

The film-drawing frame used was a chamber-type coating knife with a film width of 11 cm and a gap height of 300 µm.

The glass plate used as substrate was fixed by means of a vacuum suction plate. Prior to knife application, the glass plate was wiped with a clean-room cloth soaked in ethanol. In this way any particle impurities present were removed.

After that, the film-drawing frame was filled with the prepared solution and was drawn over the glass plate at a constant film-drawing speed of 25 mm/s.

The wet film was subsequently dried at 60° C. This gave a transparent film having a layer thickness of 30 µm.

Testing of the Membranes and Films Prepared and Produced in Examples 4, 5, and 8
Gas Transport Properties The various samples were investigated for their different $N_2$ and $O_2$ gas permeabilities using the gas permeability testing instrument GPC (Brugger). The results for the samples investigated are summarized in table 2. The measurements were conducted with a constant gas flow rate of 100 cm$^3$/min and with a constant measurement temperature of 20° C.

TABLE 2

Compilation of the membranes investigated

| Sample | $N_2$ permeability | $O_2$ permeability | $N_2/O_2$ selectivity |
|---|---|---|---|
| Ex. 4 | 1700 | 770 | 2.2 |
| Ex. 5 | 2100 | 950 | 2.2 |
| Ex. 8* | 550 | 250 | 2.2 |

Units: Barrer
*= not inventive

In table 2 it is clearly evident that the permeabilities are significantly higher as a result of the anisotropic, porous construction of the membranes of the invention from examples 4 and 5, in comparison to the film from example 8 produced from solid material. The $N_2/O_2$ selectivity, however, remains equally high.

These properties make the membranes of the invention significantly more efficient than membranes of the prior art.
Mechanical Investigations on the Membranes and Films from Examples 4, 5 and 8.

The tensile tests were carried out in accordance with EN ISO 527-3.

For the investigation of the mechanical properties, three rectangular test specimens (6 cm*1 cm) were punched from each of the membranes and films prepared and produced.

The test specimens thus produced were pulled apart at a speed of 0.5 cm/s. The stress/strain curves determined were used to ascertain the elasticity modulus and the yield stress.

Relative to the sample weight of the films, the membranes of the invention from examples 4 and 5 had a significantly increased elasticity modulus and a higher yield stress than the comparative example 8.

The porous membranes are hence significantly more stable and more mechanically robust than the membranes prepared from solid material.

In light of the examples given, it is clearly evident that porous membranes comprising organopolysiloxane/polyurea/polyurethane/polyamide/polyoxalyldiamine copolymers achieve profiles of properties that are significantly superior to the prior art.

The invention claimed is:

1. Porous membranes (M) consisting of organopolysiloxane/polyurea copolymers of the general formula (1):

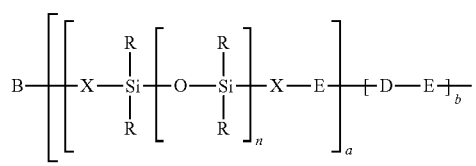

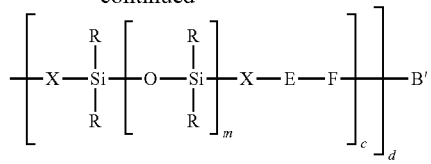

where the structural element E has the general formulae (2a)

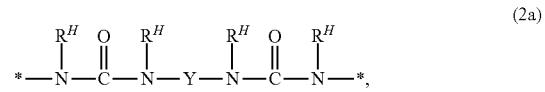

where the structural element F is selected from the general formulae (3a-f)

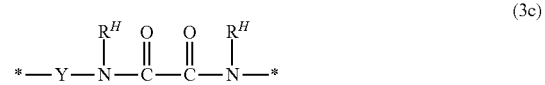

where
R is a monovalent, optionally fluorine- or chlorine-substituted hydrocarbon radical having 1 to 20 carbon atoms,
$R^H$ is hydrogen or a monovalent, optionally fluorine- or chlorine-substituted hydrocarbon radical having 1 to 22 carbon atoms,
X is an alkylene radical having 1 to 20 carbon atoms, in which nonadjacent methylene units may be replaced by groups —O—, or is an arylene radical having 6 to 22 carbon atoms,
Y is a divalent, optionally fluorine- or chlorine-substituted hydrocarbon radical having 1 to 20 carbon atoms,
D is an optionally fluorine-, chlorine-, $C_1$-$C_6$-alkyl- or $C_1$-$C_6$-alkyl ester-substituted alkylene radical having 1 to 700 carbon atoms, in which nonadjacent methylene units may be replaced by groups —O—, —COO—, —OCO— or —OCOO—, or is an arylene radical having 6 to 22 carbon atoms,
B and B' are each a reactive or nonreactive end group which is bonded covalently to the polymer,
m is an integer from 1 to 4000,
n is an integer from 1 to 4000, a is an integer of at least 1,
b is an integer from 0 to 40,
c is an integer from 0 to 30, and
d is an integer greater than 0,
   with the proviso that at least 10% of the radials $R^H$ are hydrogen,
wherein said membranes have an asymmetrical construction comprising: (a) a separation selective outer layer comprising the copolymers; and (b) a porous understructure comprising the copolymers, such that the membranes are sufficiently porous so as to separate mixtures.

2. The porous membranes (M) as claimed in claim 1, wherein R denotes a monovalent unsubstituted hydrocarbon radical having 1 to 6 carbon atoms.

3. The porous membranes (M) as claimed in claim 1, wherein a denotes a number of not more than 50.

4. The porous membranes (M) as claimed in claim 1, wherein n denotes a number from 15 to 400.

5. A process for preparing the porous membranes (M) as claimed in claim 1, from organopolysiloxane/polyurea copolymers of the above general formula (1), by a phase inversion process, wherein, from a solution of organopolysiloxane/polyurea copolymers solvent (L), a film is produced and the solvent (L)-comprising film is contacted with a precipitating medium (F).

6. The process as claimed in claim 5, wherein solvent (L) and precipitating medium (F) are removed from the solvent (L)-comprising film by evaporation.

7. The process as claimed in claim 5, wherein the solvent (L)-comprising polymer film is immersed into a precipitation bath filled with precipitating medium (F).

8. The process as claimed in claim 5, wherein the solvent (L) or a solvent mixture (L) which was used for preparing the solution dissolves in the precipitating medium (F).

9. A method for separating a mixture, said method comprising using the porous membranes (M) as claimed in claim 1 to separate the mixture.

\* \* \* \* \*